United States Patent
Marsili

(10) Patent No.: US 7,634,013 B2
(45) Date of Patent: Dec. 15, 2009

(54) DC OFFSET ESTIMATION AND COMPENSATION OF OFDM RADIO RECEIVERS BY WEIGHTED AVERAGING OVER A SECTION OF THE TRAINING SEQUENCE

(75) Inventor: Stefano Marsili, Fürnitz (AT)

(73) Assignee: Infineon Technologies AG, Neubiberg (DE)

( * ) Notice: Subject to any disclaimer, the term of this patent is extended or adjusted under 35 U.S.C. 154(b) by 1000 days.

(21) Appl. No.: 10/890,666

(22) Filed: Jul. 14, 2004

(65) Prior Publication Data

US 2005/0025041 A1 Feb. 3, 2005

(30) Foreign Application Priority Data

Jul. 14, 2003 (DE) ................. 103 31 818

(51) Int. Cl.
*H04K 1/10* (2006.01)
*H04L 27/28* (2006.01)

(52) U.S. Cl. .................. 375/260; 375/253; 375/346

(58) Field of Classification Search ............... 376/319, 376/316, 323, 326, 327, 349, 351; 455/63.1, 455/296, 226.1
See application file for complete search history.

(56) References Cited

U.S. PATENT DOCUMENTS

| | | | |
|---|---|---|---|
| 5,117,291 A * | 5/1992 | Fadavi-Ardekani et al. | 348/614 |
| 6,400,778 B1 * | 6/2002 | Matui | 375/319 |
| 6,901,121 B1 * | 5/2005 | Dubrovin et al. | 375/346 |
| 7,035,589 B1 * | 4/2006 | Meng et al. | 455/63.1 |
| 7,324,609 B1 * | 1/2008 | Hwang et al. | 375/319 |
| 2003/0133518 A1 * | 7/2003 | Koomullil et al. | 375/326 |
| 2004/0240594 A1 * | 12/2004 | Rudberg | 375/346 |

FOREIGN PATENT DOCUMENTS

WO WO 02/45332 6/2002

OTHER PUBLICATIONS

Huang, Xinping et al "Gain/Phase Imbalance and DC Offset Compensation in Quadrature Modulators", IEEE, Communications Research Center Canada, 2002, pp. IV-811 to IV-814.*
Lindoff, Bengt, "Using a Direct Conversion Receiver in Edge Terminals -A New DC Offset Compensation Algorithm", IEEE, vol. 2, Sep. 18-21, 2000 pp. 959-963.*

* cited by examiner

*Primary Examiner*—Chieh M Fan
*Assistant Examiner*—Qutbuddin Ghulamali
(74) *Attorney, Agent, or Firm*—Dicke, Billig & Czaja, PLLC

(57) ABSTRACT

Each burst of an OFDM signal which is transmitted, for example, on the basis of the IEEE 802.11a/g WLAN Standard contains a preamble with a sequence of ten short training signals. The DC offset is derived from the mean value of the signal over a measurement section of the training signal sequence, with a first subsection of the measurement section in time being weighted with a rising weighting function, and a last subsection of the measurement section in time being weighted with a falling weighting function. A central subsection, which is not weighted, may be located between the two. The signal is accumulated in this way over the measurement section, and the result is divided by the sum of the weights of the subsections. Using this procedure, the averaging process has better filter characteristics than the noise contribution from the actual signal.

22 Claims, 9 Drawing Sheets

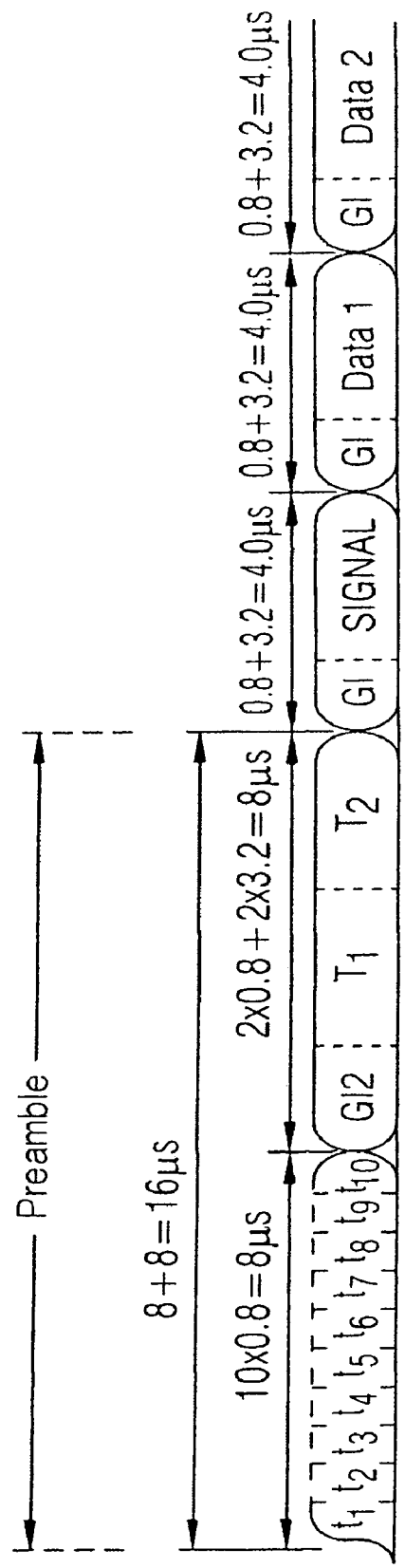

Freq. bin

Frequency [MHz]

if (start)
    $a_2(old) = 0; a_1(old) = 0; a_2(new)=0; a_1(new)=0;$ accumulation = 0;

if (time == 0.8,1.6,2.4,.... μs)
    accumulation = accumulation $-a_2(old) + a_2(new) + a_1(old)$;
    $a_2(old)=a_2(new); a_2(new)=0;$
    $a_1(old)=a_1(new); a_1(new)=0;$
if (stop)
    final_accumulator = accumulation;

DC OFFSET ESTIMATION AND COMPENSATION OF OFDM RADIO RECEIVERS BY WEIGHTED AVERAGING OVER A SECTION OF THE TRAINING SEQUENCE

PRIORITY

This application claims priority to German application no. 103 31 818.6 filed Jul. 14, 2003.

TECHNICAL FIELD OF THE INVENTION

The present invention generally relates to a method for estimation of the DC offset of a multicarrier received signal, in particular an Orthogonal Frequency Division Multiplexing (OFDM) received signal, in the reception path of a radio receiver, and to a compensation method based on the estimated DC offset. The invention likewise relates to an apparatus for carrying out the method within a receiving apparatus for multicarrier received signals.

DESCRIPTION OF RELATED ART AND BACKGROUND OF THE INVENTION

One important field of application for the OFDM transmission method is high-rate, wire-free data transmission networks such as WLAN (Wireless Local Area Network), in particular the transmission methods defined in the standards IEEE 802.11a/g and ETSI TS 101 761.1 (BRAN, Broadband Radio Access Networks). The OFDM transmission method is a multicarrier transmission method in which the data stream is subdivided between a number of parallel (orthogonal) subcarriers, which are each modulated at a correspondingly low data rate. K (sub) carrier frequencies are arranged at equidistant intervals from one another within a transmission bandwidth on the frequency scale. The carrier frequencies are located on both sides of and symmetrically with respect to a mid-frequency $f_c$. In the time domain, this results in an OFDM symbol produced by superimposition of all K carrier frequencies. The data is transmitted in the form of frames or bursts, with a frame having a structure which is defined by the standard.

FIG. 1 shows a section of a data burst which is transmitted from the transmitter end in accordance with the WLAN Standard IEEE 802.11a/g, and which starts at a time on the left-hand end, continues on the time axis to the right, and whose illustration is terminated after the second data symbol at the right-hand end. The data burst has a so-called PLCP preamble (Physical Layer Convergence Protocol), which is known from IEEE Standard 802.11a/g. This Standard describes the OFDM transmission method as a multicarrier transmission method. The payload data starts with the first OFDM symbol, which is denoted by "Data 1". Each of the OFDM symbols has a length of 3.2 µs, and each OFDM symbol is preceded by a guard interval (GI) which corresponds approximately to the maximum expected duration of the impulse response of the transmission channel (in this case 0.8 µS).

The PLCP preamble has a length of four OFDM symbols, thus lasting for a total of 16 µs, and is subdivided into two sections, which each have the same time duration. A first section of the PLCP preamble with a length of 8 µs is subdivided into ten short symbols (also referred to in the following text as short training sequences or sections), which are used for signal detection, for automatic level matching, for diversity selection, for coarse frequency determination and for time synchronization in the receiver. The second section of the PLCP preamble comprises a G12 guard interval (of twice the length of the GI) and two OFDM symbols $T_1$ and $T_2$ (which are also referred to in the following text as long training sequences or sections). These data symbols are used for channel estimation in the receiver.

The reception and demodulation of OFDM radio signals can be carried out by conventional reception concepts, which are based on the principle of superheterodyne reception followed by digital quadrature mixing. However, particularly for reasons relating to reduced power consumption and avoidance of chip-external filters for mirror-image frequency suppression, more advanced reception concepts are increasingly being preferred, which use direct-mixing methods. In the case of direct-mixing receiver concepts, the radio signal which has been received via an antenna and has been amplified is split into an in-phase (I) path and a quadrature (Q) path, and is mixed with the output frequency from a local oscillator in both paths, with the oscillator frequencies which are supplied to the mixers being shifted through 90° with respect to one another by a phase shifter. The quadrature demodulation process for recovery of the baseband signals which contain the information is thus carried out using analogue circuit technology in this reception concept.

However, it is known that direct-mixing receiver structures have a tendency to add a DC voltage [DC] offset to the received signal, for various reasons. The negative influence of this DC offset is illustrated with reference to FIG. 2. The OFDM signal may be regarded as a superimposition of N modulated carrier frequencies. The frequency separation between the carriers is constant, and the signal is generated by Fourier transformation. In the WLAN application, the carrier with the index 0 is not used, and a DC offset could thus be tolerated. In order to allow the signal to be decoded, each carrier is filtered in the receiver with a filter whose filter function is a sinc function ($f(x)=\sin(x)/x$), whose centre is at the carrier frequency. The zero points of the filter correspond to the position of the adjacent carrier frequencies, so that none of the carriers interfere with any of the other carriers. This situation in fact occurs only when there is no carrier frequency offset between the transmitter and the receiver, or between the carrier frequency of the receiver signal and the carrier frequency selected in the receiver. This situation is illustrated in FIG. 2A, in which the DC offset is the carrier placed at the frequency zero. Thus, in this specific case, the filter has a zero point exactly at the DC offset, so that there is no negative effect on the signal.

FIG. 2B illustrates the situation which always occurs in reality, in which there is also a carrier frequency offset. The DC offset is once again at the frequency zero, but the filter no longer has a zero point at this position. Some of the energy in the DC offset thus produces additional noise at the carrier frequencies. All of the carriers are thus adversely affected by this additional noise. The noise has a greater effect for carriers that are closer to DC, where the filters have a greater pass capability, than for carriers that are further away.

This has a negative influence in two ways on the signal decoding:

1) The channel estimation process, which is carried out with the long training symbols $T_1$ and $T_2$, is adversely affected relatively severely by the noise. The results of this channel estimation process are then used for equalization of all the subsequent OFDM data symbols.

2) The OFDM data symbols with the additional noise on them are equalized.

One method which is known from the prior art for estimation of the DC offset and for subsequent correction of or compensation for it is based on the fact that the WLAN signal is equal to zero on average, so that accumulation over an integer number of cycles of a periodic signal should produce a result which is proportional to the DC offset. In the prior art, this was done on the basis of a section of the ten short training symbols at the start of the PLCP preamble. In the following text, this section is also referred to as the short training sequence, since a sequence of digitized values is formed from each training symbol by A/D conversion.

FIG. 3 shows the signals that occur in the short training sequence, in the time and frequency domains. Twelve of the 52 carriers are modulated in this training sequence (FIG. 3B). The resultant signal has a periodicity of 0.8 μs (16 samples at 20 MHz). The 0.8 μs sequence is repeated ten times in the transmitter in order to produce the short training sequence as shown in FIG. 1. Since no DC carrier is used, the resultant 0.8 μs sequence has a mean value equal to zero. FIG. 3A shows the signal waveforms of the I and Q components. If one attempts to average one of these signals over a time interval which corresponds to a multiple of 0.8 μs, then this should result in the value zero irrespective of the phase angle at which the accumulation process was started. If a DC offset is in consequence superimposed on the sequence, then the result of the averaging process should give the DC offset itself.

FIG. 4 illustrates a situation in which three short sequences (3×16=48 samples at 20 MHz) have been averaged. The averaging process has a frequency-dependent pass capability in the frequency domain corresponding to the filter curve illustrated in FIG. 4. The intensity of the frequencies that are filtered by the averaging process is thus plotted on the ordinate of this diagram. The diagram additionally shows the twelve carriers which are modulated in the short training sequence and which are located exactly at the zero points of the frequency response of the filter function only if there is no carrier frequency offset, so that, in this unrealistic situation, they do not adversely affect the estimation of the DC offset.

FIG. 5 shows the same situation for the realistic case in which there is a carrier frequency offset. The maximum permissible frequency shift is ±250 kHz, with FIG. 5 showing the situation for a carrier frequency offset of −250 kHz. In this situation, the pilot carriers of the short training sequence are no longer located at the zero points of the filter function, and thus form a noise contribution to the averaging process. The averaging process was in this case carried out over an interval of 2.4 μs.

As is shown in FIG. 5, the energy in each attenuated carrier can be added up in order to estimate the noise power generated during the accumulation process, which is in the order of magnitude of −25 dB compared to the signal strength. The thermal noise should also be added to this noise contribution, whose noise power is in the order of magnitude of −10×log 10 (3×16)=−16.8 dB compared to the input noise power.

This situation is admittedly improved if more than three short sequences of the short training sequence are accumulated. However, the maximum number of sequences which are available for the estimation process is restricted, since the short training sequence comprises only ten sequences. Depending on the architecture of the reception path, some of the first sequences may be lost (owing to burst detection, gain adjustment, transients, etc.), and the number of usable, correct sequences may thus be further restricted. It is worth constraining this total number to be between two and five short sequences.

Another strategy for DC offset estimation is to carry out the estimation process during the long training sequence, which comprises the two OFDM symbols T1 and T2 (or along the OFDM data symbols which contain the payload data), to store this sequence and to correct it for the DC offset when the DC offset estimation is available, and not to use it for the channel estimation process until this has been done. In this situation, DC offset estimation over 128 samples would be possible. This results in a noise contribution to the estimation process resulting from the thermal noise of about −10×log 10(128)=−21 dB compared with the input noise power. In this case, the problem lies in the signal itself. All 52 carriers are modulated in this part of the preamble (and in all subsequent OFDM symbols). FIG. 6 shows the situation with a carrier frequency offset of −240 kHz, with the averaging process having been carried out over a section of the long training sequence of 6.4 μs. A coarse estimate of the noise that is produced by the signal itself is about −20 dB of the signal power, that is to say 5 dB worse than the noise contribution in the case of the short training sequence. In order to obtain noise contribution values which are in the same order of magnitude as the noise values obtained for the DC offset estimation process based on the short training sequence, the accumulation process must be carried out over at least four OFDM symbols. It is thus impossible to obtain a reliable DC offset estimate before the channel estimation process.

SUMMARY OF THE INVENTION

The object of the present invention is thus to specify a method for estimation of the DC offset of a multicarrier received signal, in particular an OFDM received signal, in the reception path of a radio receiver, by means of which the reliability of the DC offset estimation process can be improved. In particular, the object of the present invention is to reduce the influence of the noise on the process of carrying out the estimation process.

This object can be achieved by a method for estimation of the DC offset of a multicarrier received signal, in particular an OFDM received signal, in the reception path of a radio receiver, comprising the steps of:

transmitting the signal in bursts wherein each burst contains a sequence of identical training signals by means of which a periodic signal is formed, deriving the DC offset from the mean value of the signal over a measurement section of the training signal sequence, wherein a first subsection of the measurement section of the training sequence in time being weighted with a rising weighting function, and a last subsection of the measurement section in time being weighted with a falling weighting function.

The measurement section may have a central subsection, which is located between the first subsection and the last subsection in time, and which is not weighted. The received signal can be digitized, the digitized signal values in the measurement section can be multiplied by digital values, at corresponding times, of the respective weighting function or of the unweighted function, and the products formed in this way can be added up and the sum of the products can be divided by the sum of the weights of the subsections, with the weight of each subsection being proportional to the area under the curve of the weighting function that is used in that subsection, or of the unweighted function. The digital values of the unweighted function can be obtained by means of a digital normalization value which is constant over time, and the digital values of the rising weighting function may rise from a value of zero or close to zero to a value corresponding to or close to the normalization value, and the digital values of the falling weighting function may fall from a value corresponding to or close to the normalization value to a value of zero or close to zero. The weighting function of the first subsection in time may rise monotonally or non-monotonally, and/or the weighting function of the last subsection in time may fall monotonally or non-monotonally. The weighting function of the first subsection in time may rise linearly or non-linearly, and/or the weighting function of the last subsection in time may fall linearly or non-linearly. The transmission method can be an OFDM method, and the burst structure is specified by IEEE Standard 802.11a/g, and the preamble section, which has ten short training sequences and is located at the time at which the burst starts, may be used for the method. Quadrature demodulation can be carried out in the reception path of the radio receiver in order to form an in-phase (I) component and a quadrature (Q) component, and the method can be carried out in the I path and in the Q path. The length of the subsections may correspond to the length of one or more sections, with the length of one section corresponding to the length of a training sequence or to the period of the training sequence. The first subsection may have a length of one section, the central subsection may not exist or may have the same length as one or more sections, and the last subsection may have a length of one section. In a first subsection, the averaging process can be carried out with a rising weighting function and the result can be denoted by $a_1$, and the averaging process can be carried out with the unweighted function and the result can be denoted $a_2$, in a second subsection, the averaging process can be carried out with the unweighted function and the result can be denoted by $a_1$, and the averaging process can be carried out with the falling weighting function and the result can be denoted $a_2$, in any further subsections, the averaging process can be carried out with the unweighted function and the result can be denoted by $a_1$, and the averaging process can be carried out with the falling weighting function and the result can be denoted by $a_2$, and after the second subsection and after each further subsection, an accumulation result can be calculated from the accumulation result calculated in the previous step minus the old content of $a_2$ plus the new content of $a_2$ plus the old content of $a_1$.

The object can furthermore be achieved by an apparatus for carrying out this method which comprises means for detection of the training signal sequence, and for emission of a corresponding signal, and means for estimation of the DC offset after reception of a detection signal by the detection means.

The estimation means may comprise means for accumulation of products from digitized values of the signal from the training signal sequence and digital values of the respective weighting function or of the unweighted function, and means for division of the accumulation result by the sum of the weights of the subsections, with the weight of each subsection being proportional to the area under the curve of the weighting function used in that subsection, or of the unweighted function.

The object can also be achieved by a method for compensation for a DC offset in a multicarrier received signal, in particular an OFDM received signal, in the reception path of a radio receiver, comprising the steps of:

estimating the DC offset by the following steps:

transmitting the signal in bursts wherein each burst contains a sequence of identical training signals by means of which a periodic signal is formed, deriving the DC offset from the mean value of the signal over a measurement section of the training signal sequence, wherein a first subsection of the measurement section of the training sequence in time being weighted with a rising weighting function, and a last subsection of the measurement section in time being weighted with a falling weighting function, and subtracting the estimated DC offset from the received signal.

The estimated DC offset can be subtracted from the signal of a training signal sequence that is provided for channel estimation purposes, and channel estimation can be carried out using the signal from the training signal sequence that has been corrected in this way.

The object can furthermore be achieved by an apparatus for carrying out the above method comprising means for compensation for the DC offset arranged such that they can be supplied with the estimated DC offset and with the received signal, and the DC offset can be subtracted from the received signal.

A radio receiver may comprise an apparatus as described above.

The method according to the invention is based on the fact that the multicarrier signal is transmitted in bursts, and that each burst contains a sequence of training signals. The training signals are the same as one another, so that their sequence forms a periodic signal. The training signals may primarily be used for other purposes, such as for example for synchronization or for gain level adjustment, and the like. By way of example, it is possible to use the ten short training signals which are formed at the start of the burst on the basis of the burst structure as specified in IEEE Standard 802.11a/g. The DC offset is derived from the mean value of the signal over a measurement section of the training signal sequence.

One major aspect of the method according to the invention comprises the provision of subsections at the start and at the end of the measurement section, within which the signal from the training signal sequence to be added up in order to form the mean value is weighted in a particular manner. In this case, at the start, the aim is to weight a first subsection of the measurement section in time with a rising weighting function, and, at the end, to weight a last subsection of the measurement section in time with a falling weighting function. The rectangular measurement window as used in the prior art is thus in fact replaced by a measurement window which has a rise and a fall, in which case the weighting functions may be both linear and non-linear. As already described further below, the formation of the measurement window according to the invention makes it possible to considerably reduce the influence of the noise on the averaging process.

Between the first subsection and the last subsection, the measurement section preferably has a central subsection, which is not weighted. The process is preferably carried out such that the signal or digitized signal values within the central subsection is or are multiplied by a constant normalization value and, in the weighted subsections, is or are multiplied by weighting factors which are less than the normalization value and whose time profile is governed by the weighting functions.

In this case, the rising and falling weighting functions do not need to be monotonally rising and falling weighting functions. In fact, the rising weighting function may start with a relatively low weighting value and end with a relatively high weighting value although, in between, it may also have falling sections. In the same way, the falling weighting function may start at a relatively high weighting value and end at a relatively low weighting value, although it may also have rising sections in between. However, the simplest implementation is undoubtedly for the weighting functions to have a linear rise and fall, that is to say a ramp rise and fall, with the rising weighting function starting at zero and ending at the normalization value, and with the falling weighting function starting at the normalization value and ending at zero.

In one preferred embodiment, the received signal is first of all digitized and the accumulation process is based on the digitized signal values in the measurement section multiplied by digital values of the respective weighting functions at corresponding times, that is to say by the abovementioned weighting factors, or the digital normalization value of the unweighted function. The products formed in this way are then added up, and the sum of the products is formed. The actual accumulation process is thus completed first of all. Then, the accumulation result must also be divided by the sum of the weights of the subsections, with the weight of each subsection being proportional to the area under the curve of the weighting function that is used in the subsection, or the unweighted function. If, for example in the simplest case, the weighting function is a linearly rising or linearly falling ramp, then the weight is 0.5, if it is normalized with respect to 1 in the unweighted case.

The digital values of the unweighted functions can be provided by a digital normalization value which is constant over time. The digital values of the rising weighting function should then rise from a value of zero or close to zero to a value corresponding to or close to the normalization value, and the digital values of the falling weighting functions should fall from a value corresponding to or close to the normalization value to a value which is zero or is close to zero.

As already mentioned, it is possible to use simple weighting functions with a linear, ramp rise or fall. However, non-linear weighting functions may likewise be used.

In the same way, it is also possible to use weighting functions with a non-monotonal rise or fall.

One important application for the method according to the invention is the OFDM transmission method and, in this case in particular, a transmission method which is specified by IEEE Standard 802.11a/g, in which a burst structure is specified, which uses a section of the preamble with ten short training signals at the time at which the burst starts. A section of this training signal may be used as a measurement section for the method according to the invention. This has the advantage that the DC offset is known after the accumulation process and evaluation, and can be used in this form for the DC compensation for the subsequent long training signal sequence, so that this allows improved channel estimation.

The length of the subsections may correspond to the length of one or more sections, with the length of one section corresponding to the length of a training signal, that is to say to the period length of the entire signal sequence. The normal situation for carrying out the method according to the invention thus comprises the first subsection having the same length as one section, the central subsections having the length of one or more sections, and the last subsection having a length of one section.

The method according to the invention may be developed to provide a compensation method by first of all estimating the DC offset as described above and then subtracting the estimated DC offset from the received signal. The compensation process may actually advantageously be used in the burst which is associated with the training signal sequence that is used for the estimation process. As has already been mentioned above, the compensation process may also in fact be carried out for the received signal in the long training signal sequence, so that the channel estimation process that is carried out using this long training signal sequence can be carried out more reliably.

An apparatus for carrying out the method according to the invention has means for detection of the training signal sequence which is used for the estimation process, and for emission of a corresponding signal, as well as means for estimation of the DC offset after reception of a detection signal by the detection means.

Means for digitization of the received signal is preferably arranged in the reception path upstream of the estimation means. The estimation means may then include means for accumulation of products from digitized values (training sequence) of the signal from the training signal sequence, and digital values of the respective weighting function or of the unweighted function. Furthermore, the estimation means may contain means for division of the accumulation result by the sum of the weights of the subsections.

Furthermore, an improved apparatus has means in order to compensate for the DC offset, which are arranged such that the estimated DC offset and the received signal can be supplied, and the DC offset can be subtracted from the received signal.

BRIEF DESCRIPTION OF THE DRAWINGS

The method according to the invention and apparatus will be explained in more detail in the following text with reference to further details as well as exemplary embodiments, in conjunction with the following drawings, in which:

FIG. 1 shows a burst structure based on IEEE Standard 802.11a/g;

DETAILED DESCRIPTION OF PREFERRED EMBODIMENTS

Figure 7A:
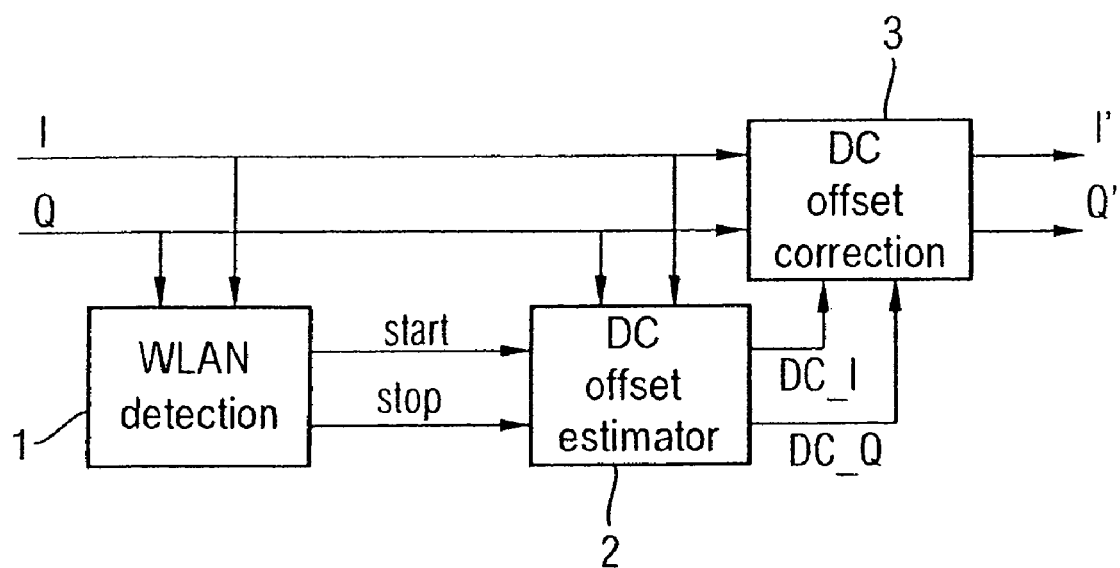
FIG. 7 shows a block diagram for carrying out the method (A) according to the invention, with a block diagram of the DC offset estimator (B)

As is shown in the block diagram in FIG. 7A, an OFDM received signal is subjected in the reception path of an OFDM radio receiver to quadrature demodulation, in the process of which an I (in-phase) component and a Q (quadrature) component are produced. Both signal components are supplied to a WLAN detection unit 1, whose object is to detect the presence of a WLAN signal in accordance with one of the WLAN or ETSI Standards mentioned initially, by detection of the short training signal sequence. As soon as this part of the preamble has been detected, the WLAN detection unit 1 signals this fact by means of a start signal to a DC offset estimator 2. It likewise transmits a stop signal to the DC offset estimator 2 when the end of the short training signal sequence has been reached.

The DC offset estimator 2 can carry out the estimation of the DC offset between the start signal and the stop signal. Once the end of the short training signal sequence has been reached, the DC offset estimator 2 emits the estimation result DC_I for the I component and DC_Q for the Q component to a DC offset correction unit 3. The DC offset correction unit 3 is likewise supplied with the quadrature-demodulated, uncorrected I and Q components. The DC offset correction unit 3 corrects the I component and Q component and compensates for the DC offset contained in them, by in each case subtracting the respective estimated values DC_I and DC_Q, which have been transmitted to it from the DC offset estimator 2, from both signals. As a result of the subtraction process, the DC offset correction unit 3 emits corrected or compensated signals I' and Q'.

Figure 7B:
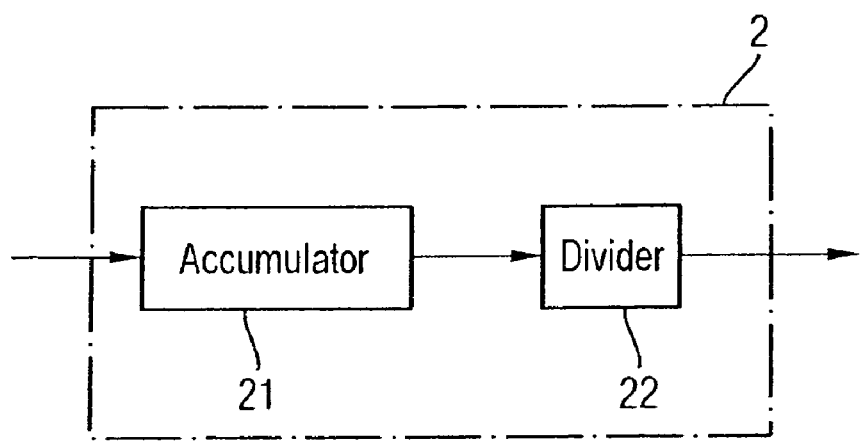

As is shown in FIG. 7B, the DC offset estimator 2 contains an accumulator 21 and a divider 22 in each of the two paths for the I component and the Q component. The accumulation process for the DC offset estimation method according to the invention is carried out in the accumulator 21. The accumulation result is divided in the divider 22 by the sum of the weights of the subsections.

The I and Q signal is in each case digitized by an A/D converter (not illustrated), and digitized sample values are supplied to the accumulator 21. The accumulation process is no longer carried out, as in the case of the prior art, simply by adding up the sample values over a measurement interval. In fact, the sample values are first of all weighted, and are then added up. For this purpose, the accumulator 21 is likewise supplied with digital values of a weighting function. In this case, the following three weighting functions can be defined:
1) rising weighting
2) no weighting
3) falling weighting Linear, ramp profiles of the weighting function may be provided for the rising and falling weighting functions. The profiles may, however, also be non-linear, for example having the profile of a raised cosine function.

Figure 2A:
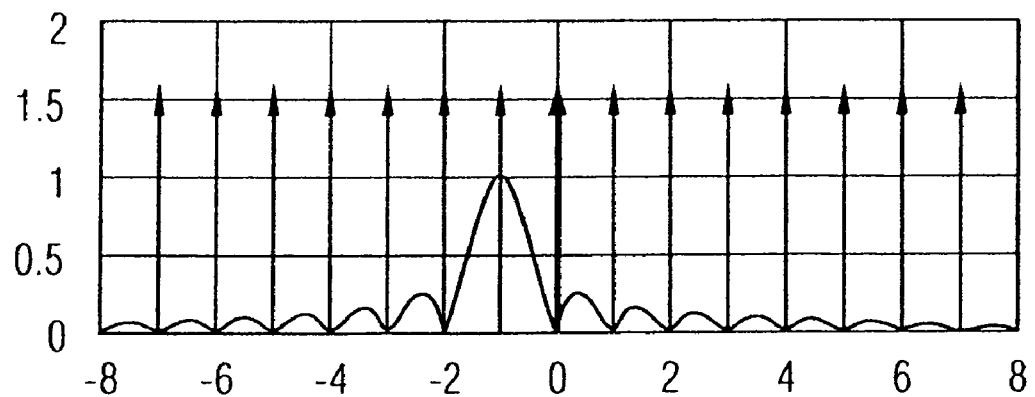
FIG. 2 shows the influence of the DC offset without any carrier frequency offset (A) and with a carrier frequency offset (B)
Figure 2B:
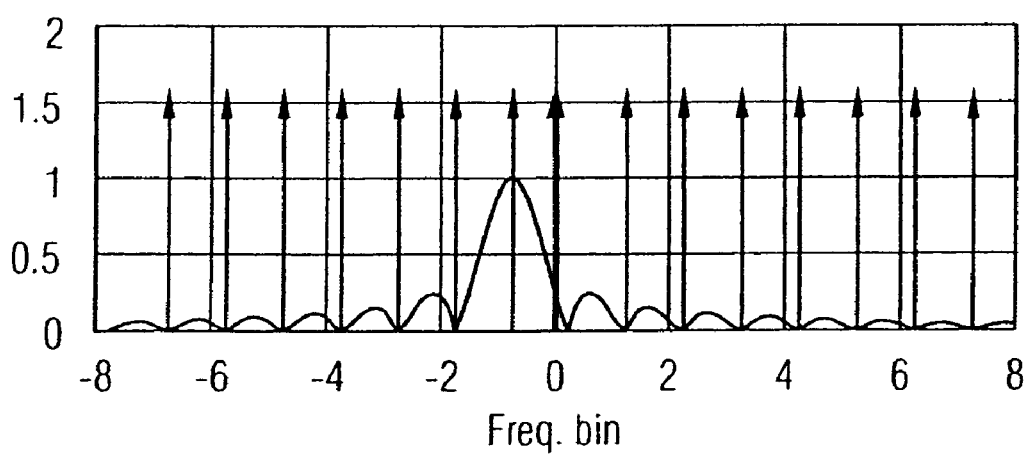
Figure 3A:
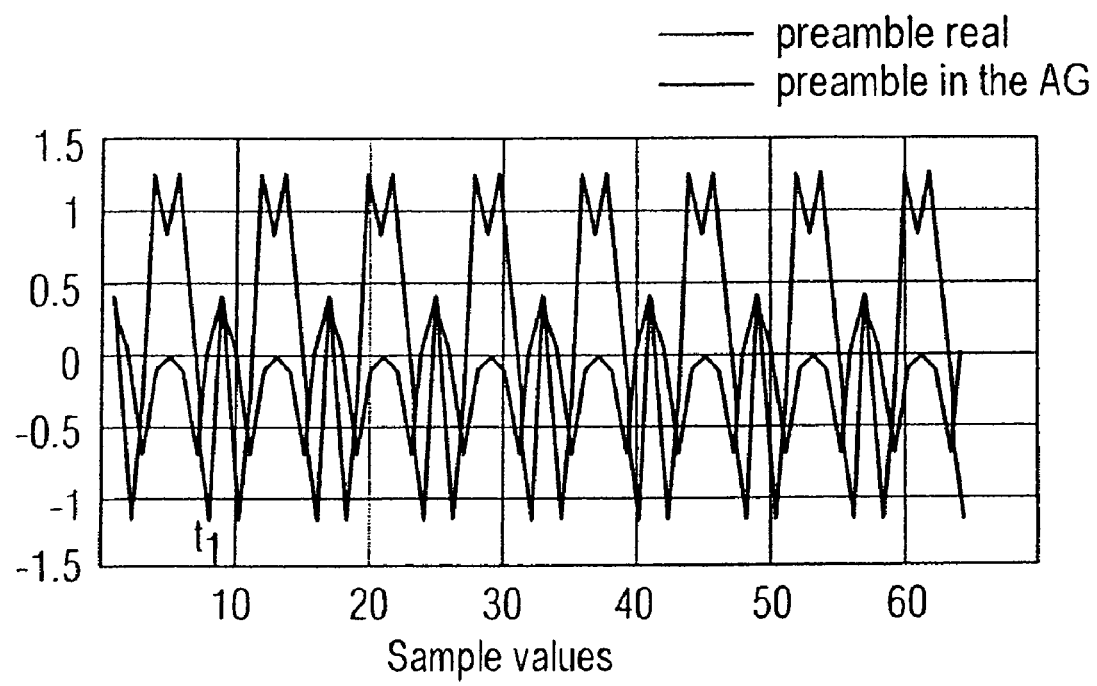
FIG. 3 shows a short training signal sequence in the time domain (A) (with an I component and a Q component) and in the frequency domain (B)
Figure 3B:
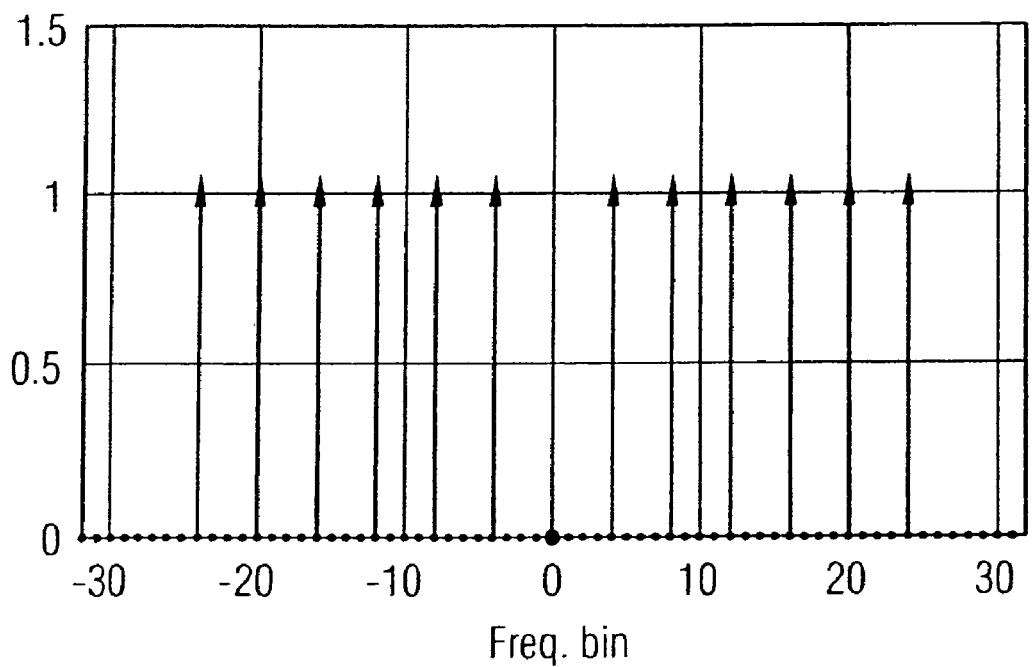
Figure 4:
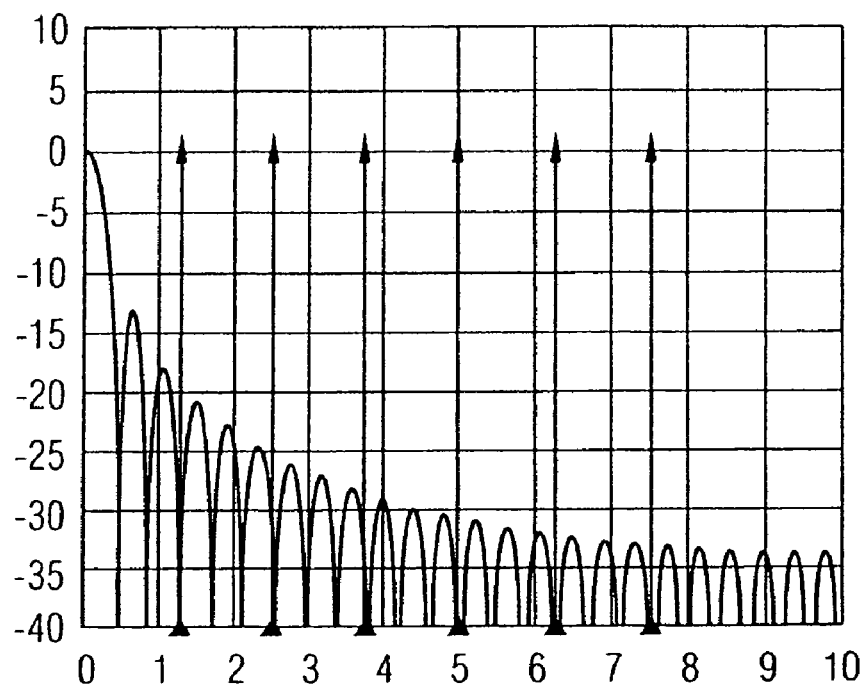
FIG. 4 shows a frequency-dependent filter function for a conventional averaging process over an interval of 2.4 µs without any carrier frequency offset.
Figure 5:
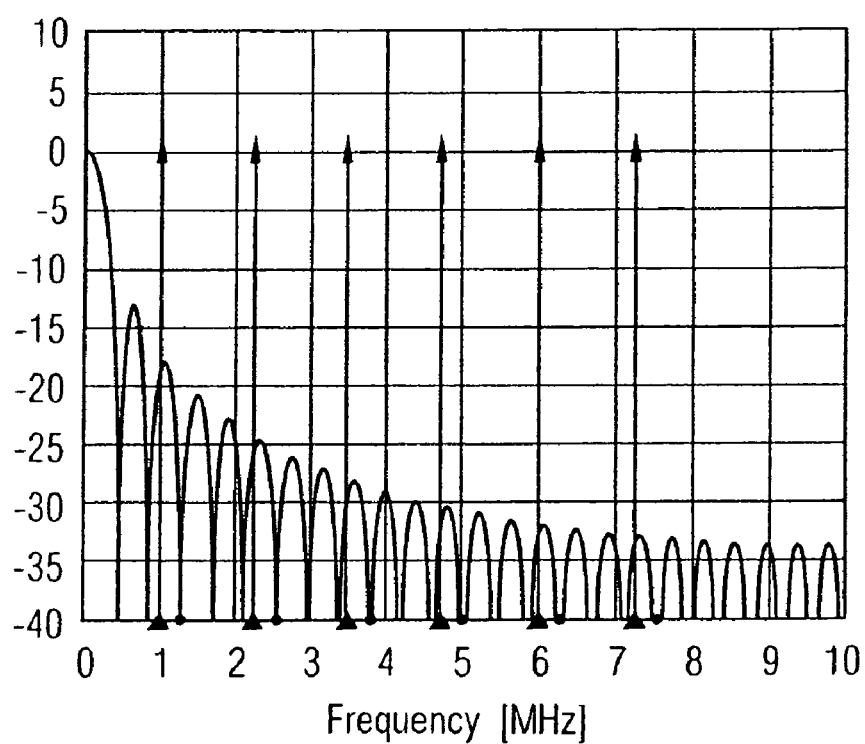
FIG. 5 shows a frequency-dependent filter function for a conventional averaging process over an interval of 2.4 µs with a carrier frequency offset of −250 kHz.
Figure 6:
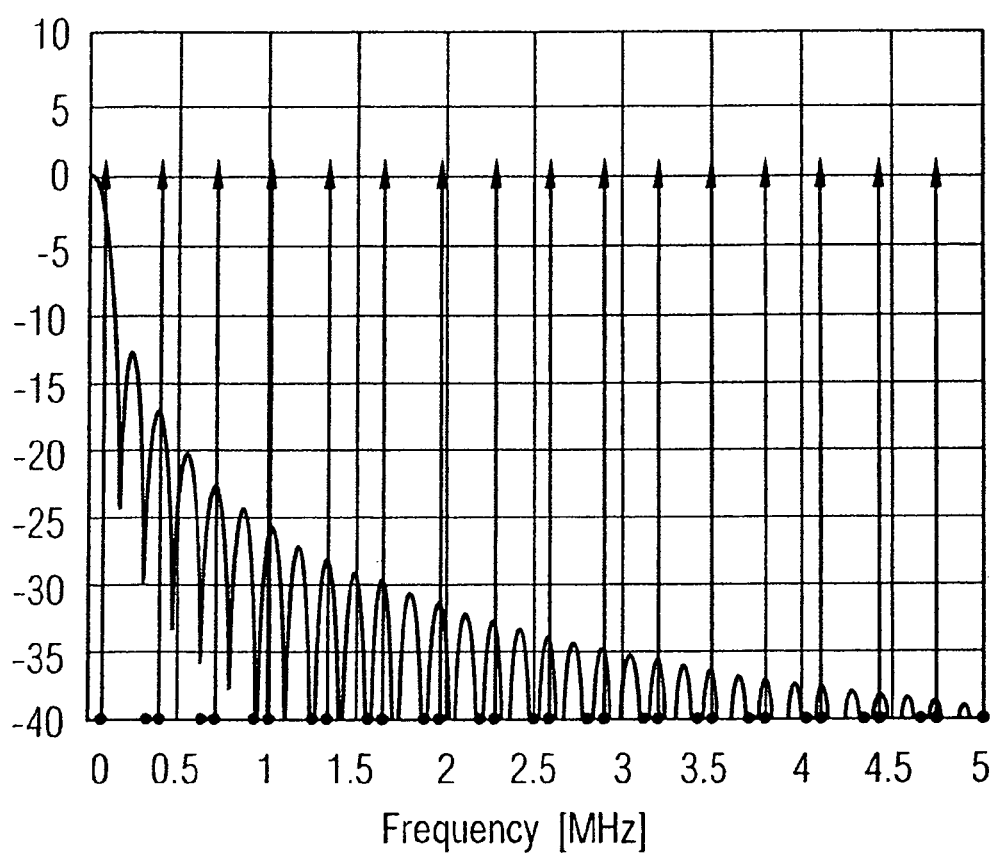
FIG. 6 shows a frequency-dependent filter function for a conventional averaging process over a time interval of 6.4 µs for the long training signal sequence, with a carrier frequency offset of −250 kHz.
Figure 8:
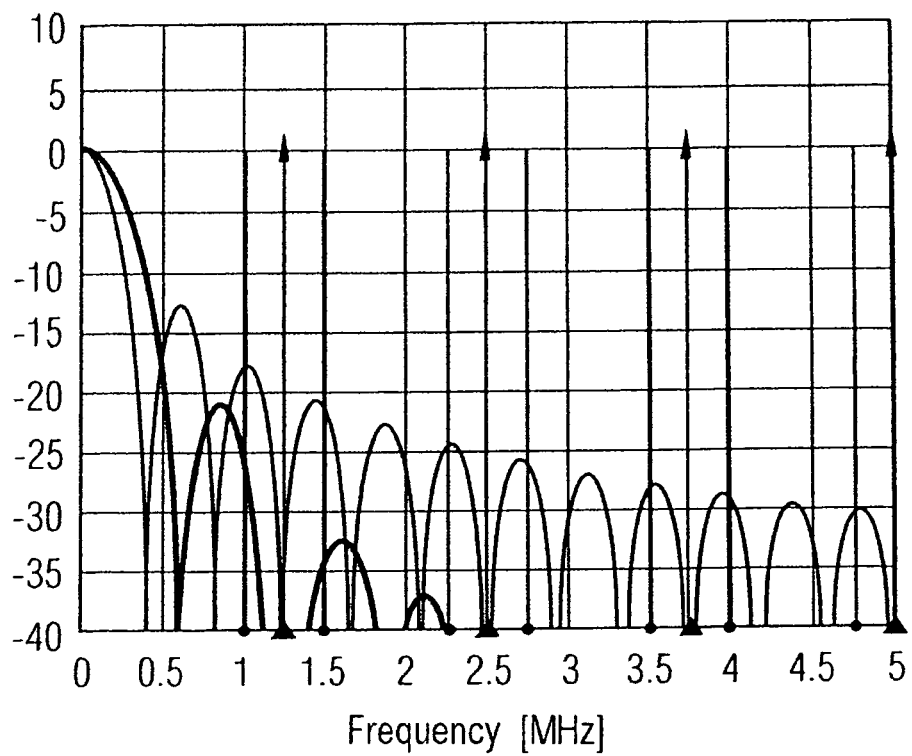
FIG. 8 shows a frequency-dependent filter function for an averaging process according to the invention over an interval of 2.4 µs (thick lines)

In FIG. 8, thin lines are once again used first of all to show the frequency-dependent filter function of a conventional averaging process over the same 2.4 μs measurement intervals as in FIGS. 4 and 5 (48 samples at 20 MHz). In addition, thick lines now show the frequency-dependent filter function of an averaging process in which the method according to the invention has been used. In this case, the averaging process was carried out over three sections, with each section corresponding to a training sequence and having a length of 0.8 μs. In the first section, the signal was weighted with a linearly rising weighting function, in the second section, the signal was not weighted, and in the third section the signal was weighted with a linearly falling weighting function. As can be seen, a carrier frequency offset of ±250 kHz results in only three lobes of the filter pass function above −40 dB in addition to the central lobe, while all of the lobes are above −40 dB when the process is carried out in the conventional manner (thin lines). This means that it is possible to estimate approximately that the noise produced by the signal itself is in the order of magnitude of −35 dB compared with the signal power, thus resulting in an improvement of +10 dB compared to the averaging process according to the prior art.

FIG. 8 likewise shows that the response for frequencies up to 0.5 MHz when using the filter function based on the method according to the invention is poorer than that when using the conventional method. This means that the estimation noise has increased slightly, owing to the thermal noise. In the example of a measurement interval of 2.4 μs (48 sample values), the difference varies in the order of magnitude of the noise being increased by 1 dB. This means −15.8 dB of noise power in comparison to −16.8 dB for the conventional method. This deterioration is negligible if it is remembered that good DC offset estimation is particularly desirable for high-rate transmission modes, in which the noise power is already small compared to the signal power (−20 dB or less).

Figure 9:
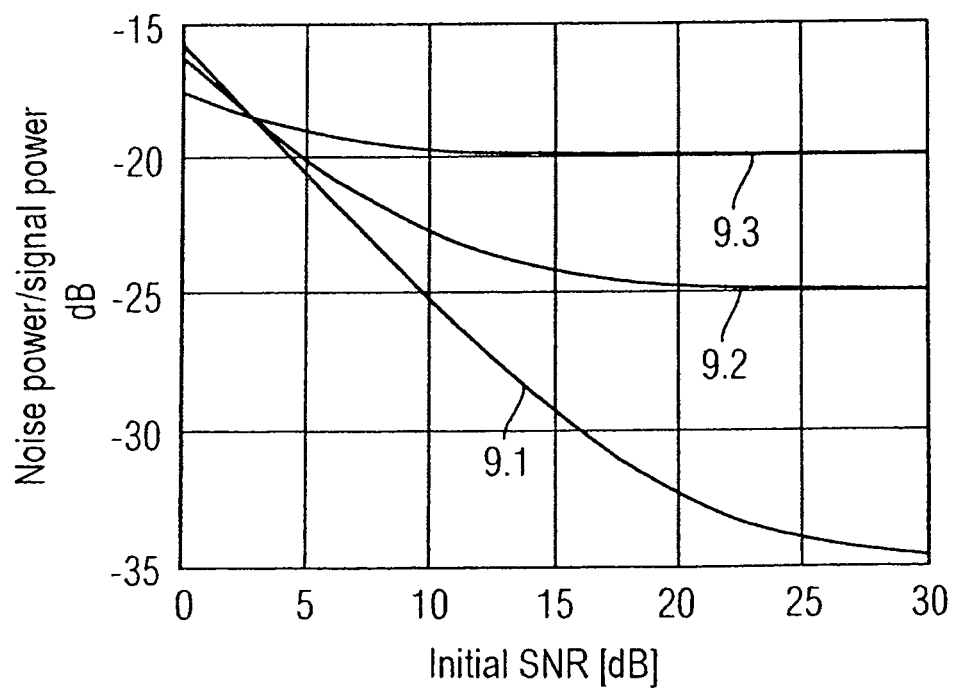
FIG. 9 shows the dependency of the relationship between the (unfiltered) noise power transmitted by the averaging process to the signal power as a function of the input noise power for the method according to the invention (9.1), for the conventional method with the short training signal sequence (9.2), and for the conventional method with the long training signal sequence (9.3)

FIG. 9 shows the relationship between the (estimated) noise power and the signal power as a function of the input signal-to-noise ratio for various implementations, based on the assumption of a carrier frequency offset of 250 kHz. The curve 9.1 shows the relationship for the method according to the invention, the curve 9.2 shows the relationship for a conventional method using the short training signal sequence, and the curve 9.3 shows the relationship for a conventional method using the long training signal sequence. The measurement window was 2.4 μs for the curves 9.1 and 9.2 and was 6.4 μs for the curve 9.3, that is to say the entire long training signal sequence. As can be seen, the method according to the invention gives a better result than the conventional method even for an input signal-to-noise ratio of more than 2.8 dB. With regard to the long training signal sequence, no type of weighting leads to any significant improvement in the averaging process, even though a very much greater number of sample values are available (128 in comparison to 48 in the method according to the invention).

The estimation of the DC offset becomes better the greater the number of sections that are used for the averaging process or short training sequences that are used for the averaging process. As many short training sequences as possible should therefore be used for the estimation of the DC offset.

Figures 10, 11:
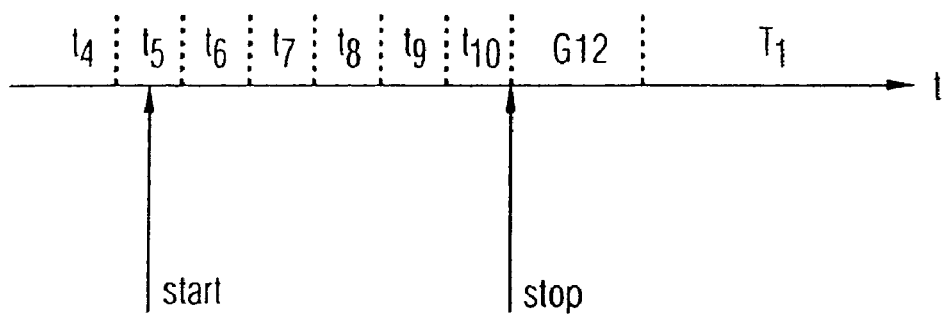
FIG. 10 shows a part of the standard training signal sequence with the start signal and the stop signal of the detection unit shown in FIG. 7.
FIG. 11 is a diagram illustration of one way to carry out the method according to the invention based on the algorithm shown in FIG. 12.

The implementation described in the following text is based on the assumption that the start signal which is emitted by the WLAN detection unit 1 as shown in FIG. 7 is emitted at a time which is not clearly defined and, by way of example and as is shown in FIG. 10, can occur at any given time within the training sequence t5. This represents the typical situation, in which the detection of the burst can take a variable amount of time depending on the transmission conditions, and the signal is not stored in a memory.

The WLAN detection unit shown in FIG. 7 likewise emits a stop signal when the short training sequence has reached its end.

A first implementation option comprises the storage of all of the sample values between the start and the stop, and the post-processing of the sample values, after the stop signal, corresponding to the available set of sample values with the best weighting functions.

Figure 12:
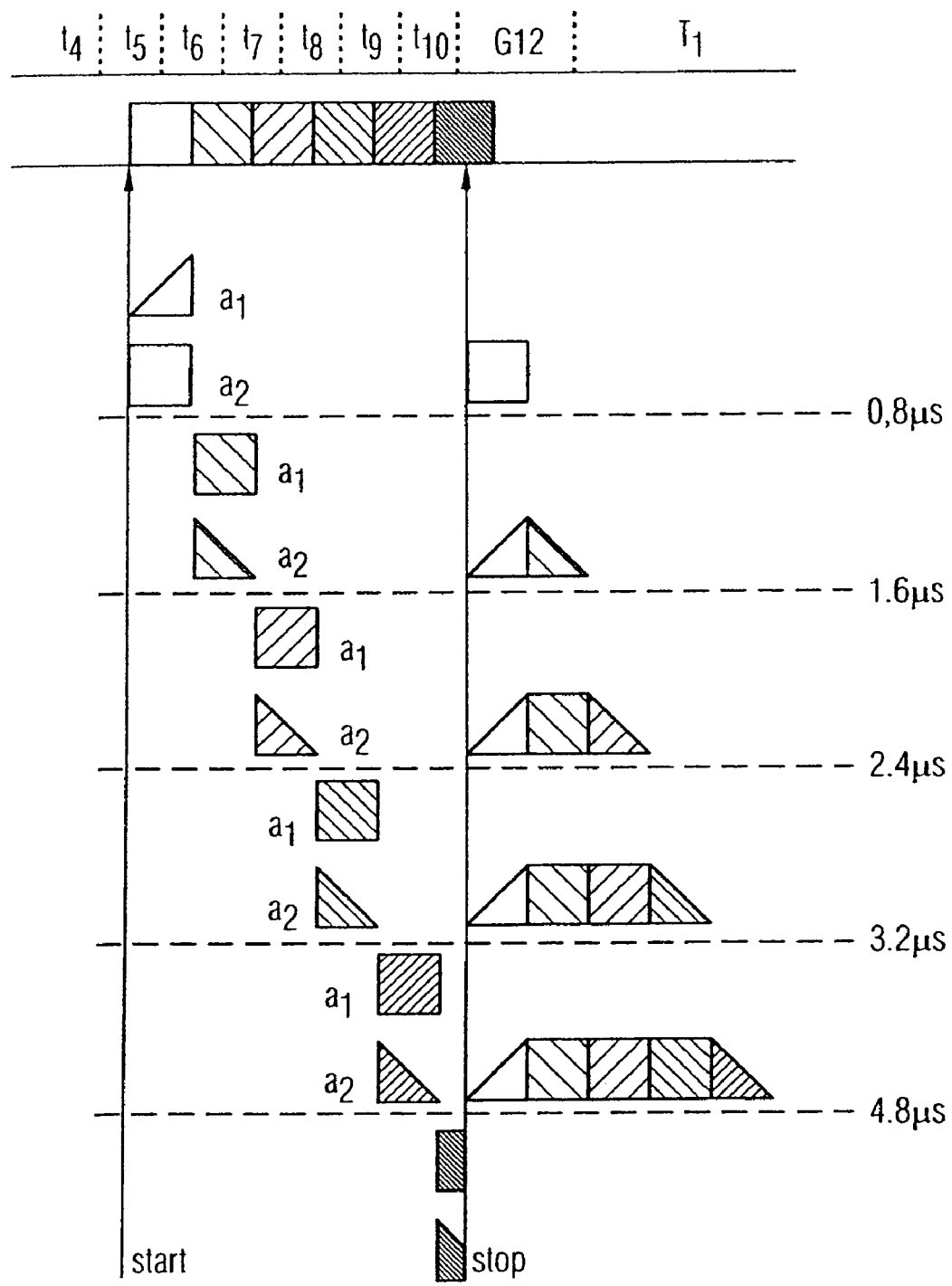
FIG. 12 shows an algorithm for carrying out the method according to the invention.

In contrast, the following text describes an implementation which, instead of this, avoids such complex storage, without having to define a fixed number of sample values for the averaging process. The estimate is calculated without any post-processing phase, based on the dynamic accumulation process illustrated in FIG. 11. FIG. 12 shows a pseudo-code representation of the algorithm for implementation.

Starting from the start signal, the digitized input signal is accumulated over a section of 0.8 μs. The accumulation process is carried out in each case for the I component and the Q component. In the first section, it is also carried out with two different weighting functions, in which case an accumulation result which has been calculated using the rising weighting function is denoted by a variable a1, and an accumulation result which has been calculated using the unweighted function is denoted by the variable a2. At the end of the section, a first approximate accumulation result is available, and is equal to a2. The same process is repeated for the second section of 0.8 μs. This time, an accumulation result which is calculated using the unweighted function is denoted by a1, and the accumulation result which is calculated using the falling weighting function is set to a2. At the end of the section, a new, more precise accumulation result is available, which is equal to the old estimated accumulation result minus the old content of the variable a2 plus the new content of the variable a2 and the old content of the variable a1. The process can now be repeated for each further section of 0.8 μs, with the accumulation result which is calculated using the unweighted function always being set to a1, and the accumulation result which is calculated using the falling weighting function being set to a2.

The process is carried out until the stop signal (or until the maximum desired number of sections have been accumulated), which will in general be in the centre of an accumulation of a 0.8 μs section. The final DC offset estimated value is then the most recently determined accumulation result divided by the sum of the weight used. If the weighting functions are chosen in a suitable manner, the weights are given by integers, so that the final division can be implemented in a simple and efficient manner (powers of two or single division factors).

The following digital values of the weighting functions when used in the implementation in FIG. 11:

Rising weighting function: 1 3 5 7 9 11 13 15 17 19 21 23 25 27 29 31

The sum of these values is 256.

Unweighted function: 32 32 32 . . . 32 (16×32)

The sum is 512 (for each section).

Falling weighting function: digital values of the rising weighting function in the opposite sequence.

The sum is 256.

In the example shown in FIG. 11, the accumulation result will be divided, after the stop signal, by (256+256+512+512+512)=4×512.

It is possible to choose other sequences of digital values for the rising weighting function and the falling weighting function, which may achieve better results. These alternative sequences of digital values may, as already explained, correspond to a non-linear profile of the weighting functions. Furthermore, it is not absolutely essential for the profile of the weighting functions to be monotonal. For example, the following sequence of digital values may be used for the rising weighting function:

Rising weighting function: 4.85 0.90 8.07 5.65 10.66 10.80 13.15 15.71 16.13 19.84 20.00 22.94 24.76 25.24 29.93 27.35

The sum is once again 256.

I claim:

1. A method for estimation of a DC offset of a multicarrier received signal in a reception path of a radio receiver, comprising the steps of:

transmitting the multicarrier received signal in bursts wherein each burst contains a sequence of identical training signals by means of which a periodic signal is formed, deriving the DC offset from a mean value of the periodic signal over a measurement section of the sequence of identical training signals, wherein a first subsection of the measurement section of the sequence of identical training signals in time being weighted with a rising weighting function, and a last subsection of the measurement section in time being weighted with a falling weighting function.

2. The method according to claim 1, wherein the measurement section has a central subsection, which is located between the first subsection and the last subsection in time, and which is not weighted.

3. The method according to claim 1, wherein a) the received signal is digitized, b) the digitized signal values in the measurement section are multiplied by digital values, at corresponding times, of the respective weighting function or of an unweighted function, to form products, and c) the products formed are added up and the sum of the products is divided by the sum of the weights of the subsections, with the weight of each subsection being proportional to the area under the curve of the weighting function that is used in that subsection, or of the unweighted function.

4. The method according to claim 3, wherein the digital values of the unweighted function are obtained by means of a digital normalization value which is constant over time, and the digital values of the rising weighting function rise from a value of zero or close to zero to a value corresponding to or close to the normalization value, and the digital values of the falling weighting function fall from a value corresponding to or close to the normalization value to a value of zero or close to zero.

5. The method according to claim 3, wherein the first subsection has a length of one section, the central subsection does not exist or has the same length as one or more sections, and the last subsection has a length of one section.

6. The method according to claim 1, wherein the weighting function of the first subsection in time rises monotonally or non-monotonally, and or the weighting function of the last subsection in time falls monotonally or non-monotonally.

7. The method according to claim 1, wherein the weighting function of the first subsection in time rises linearly or nonlinearly, and or the weighting function of the last subsection in time falls linearly or nonlinearly.

8. The method according to claim 1, wherein the transmission method is an OFDM method, and the burst structure is specified by IEEE Standard 802.11 a/g, and the preamble section, which has ten short training sequences and is located at the time at which the burst starts, is used for the method.

9. The method according to claim 1, wherein quadrature demodulation is carried out in the reception path of the radio receiver in order to form an in-phase (I) component and a quadrature (Q) component, and the method is carried out in the I path and in the Q path.

10. The method according to claim 1, wherein
the length of the subsections corresponds to the length of one or more sections, with the length of one section corresponding to the length of a training sequence or to the period of the training sequence.

11. The method according to claim 1, wherein
in the first subsection, an averaging process is carried out with a rising weighting function and the result is denoted by $a_1$, and the averaging process is carried out with the unweighted function and the result is denoted $a_2$,
in a second subsection, the averaging process is carried out with the unweighted function and the result is denoted by $a_1$, and the averaging process is carried out with the falling weighting function and the result is denoted $a_2$,
in any further subsections, the averaging process is carried out with the unweighted function and the result is denoted by $a_1$, and the averaging process is carried out with the falling weighting function and the result is denoted by $a_2$, and
after the second subsection and after each further subsection, an accumulation result is calculated from the accumulation result calculated in the previous step minus the old content of $a_2$ plus the new content of $a_2$ plus the old content of $a_1$.

12. An apparatus for carrying out the method according to claim 1, comprising
means for detection of the training signal sequence, and for emission of a corresponding signal,
means for estimation of the DC offset after reception of a detection signal by the detection means.

13. The apparatus according to claim 12, wherein
the estimation means comprise
means for accumulation of products from digitized values of the signal from the training signal sequence and digital values of the respective weighting function or of the unweighted function, and
means for division of the accumulation result by the sum of the weights of the subsections, with the weight of each subsection being proportional to the area under the curve of the weighting function used in that subsection, or of the unweighted function.

14. The method of claim 1, wherein the multicarrier received signal is an Orthogonal Frequency Division Multiplexing (OFDM) received signal.

15. A method for compensation for a DC offset in a multicarrier received signal in a reception path of a radio receiver, comprising the steps of:
estimating the DC offset by the following steps:
transmitting the multicarrier received signal in bursts wherein each burst contains a sequence of identical training signals by means of which a periodic signal is formed,
deriving the DC offset from a mean value of the periodic signal over a measurement section of the sequence of the identical training signals, wherein
a first subsection of the measurement section of the sequence of identical training signals in time being weighted with a rising weighting function, and a last subsection of the measurement section in time being weighted with a falling weighting function, and
subtracting the estimated DC offset from the received signal.

16. The method according to claim 15, wherein
the estimated DC offset is subtracted from the signal of a training signal sequence that is provided for channel estimation purposes, and channel estimation is carried out using the signal from the training signal sequence that has been corrected in this way.

17. An apparatus for carrying out the method according to claim 15, comprising:
a compensation unit configured to compensate the DC offset arranged such that the compensation unit is configured to be supplied with the estimated DC offset and with the received signal, and to substract the DC offset from the received signal.

18. An apparatus for estimation of a DC offset of a multicarrier received signal in a reception path of a radio receiver, comprising
a transmitter for transmitting the signal in bursts wherein each burst contains a sequence of identical training signals by means of which a periodic signal is formed,
means for deriving the DC offset from a mean value of the periodic signal over a measurement section of the sequence of identical training signals, wherein a first subsection of the measurement section of the sequence of identical training signals in time being weighted with a rising weighting function, and a last subsection of the measurement section in time being weighted with a falling weighting function.

19. A radio receiver comprising an apparatus according to claims 18.

20. The apparatus of claim 18, wherein the multicarrier received signal is an Orthogonal Frequency Division Multiplexing (OFDM) received signal.

21. An apparatus for compensation for a DC offset in a multicarrier received signal in the reception path of a radio receiver, comprising:
means for transmitting the received signal in bursts wherein each burst contains a sequence of identical training signals by means of which a periodic signal is formed,
means for deriving an estimated DC offset from a mean value of the periodic signal over a measurement section of the sequence of identical training, wherein a first subsection of the measurement section of the sequence of the identical training signals in time being weighted with a rising weighting function, and a last subsection of the measurement section in time being weighted with a falling weighting function,
means for subtracting the estimated DC offset from the received signal, and
means for compensation for the DC offset arranged such that the means for compensation are supplied with the estimated DC offset and with the received signal, and the means for compensation are able to substract the DC offset from the received signal.

22. A radio receiver comprising an apparatus according to claims 21.

* * * * *